United States Patent [19]

Schulze et al.

[11] 4,110,313

[45] Aug. 29, 1978

[54] EPOXY CURING AGENT

[75] Inventors: Heinz Schulze; Harold G. Waddill, both of Austin, Tex.

[73] Assignee: Texaco Development Corporation, New York, N.Y.

[21] Appl. No.: 812,558

[22] Filed: Jul. 5, 1977

[51] Int. Cl.$^2$ .................... C08G 59/50; C08G 59/56
[52] U.S. Cl. ........................ 528/90; 528/94; 528/93; 528/121; 528/123
[58] Field of Search .................... 260/47 EN, 2 N

[56] References Cited

U.S. PATENT DOCUMENTS

| | | | |
|---|---|---|---|
| 3,591,556 | 7/1971 | Godfrey et al. | 260/47 |
| 3,943,104 | 3/1976 | Waddill | 260/47 EN |
| 4,011,281 | 3/1977 | Waddill et al. | 260/830 S |

FOREIGN PATENT DOCUMENTS 1,356,188  6/1974  United Kingdom.

*Primary Examiner*—M. J. Welsh
*Assistant Examiner*—E. A. Nielsen
*Attorney, Agent, or Firm*—Carl G. Ries; Thomas H. Whaley; Walter D. Hunter

[57] ABSTRACT

Epoxy resins, particularly those of the polyglycidyl ether of a polyhydric phenol type, are cured by incorporating therein a polyoxyalkylenepolyamine usually with an accelerator such as a combination of piperazine and an alkanolamine. Rapidity of curing is further improved by substituting from about 50 wt% to 100 wt% of the dithiocarbamate salt of the polyoxyalkylenepolymine for the polyoxyalkylenepolyamine. The epoxy resin products are useful in protective coatings, adhesives, seamless and terrazzo flooring, castings, laminates, and in grouting, potting, encapsulating, caulking and sealing compositions.

6 Claims, No Drawings

EPOXY CURING AGENT

BACKGROUND OF THE INVENTION

1. Field of the Invention

This invention relates to an improved method for curing epoxy resins and the resin product thus produced.

2. Description of Prior Art

U.S. Pat. No. 3,467,393 to Legler (1969) teaches the use of a polyoxyalkylenepolyamine for curing a polyglycidyl ether of a polyhydric phenol. Homan's U.S. Pat. No. 2,783,214 (1957) discloses the curing of an epichlorohydrin-bisphenol resin-forming material at ambient temperature with a specific mixture of amines, i.e., a major amount of triethylene tetramine and a minor amount of triethanolamine, in the presence of a highly reactive substance which will polymerize spontaneously in the presence of the stated amines.

In several applications, accelerated curing of epoxy resins at ambient temperatures is essential. A typical situation is the use of an epoxy resin as an adhesive in a flammable environment. Many known prior art processes for preparing low temperature cured epoxy resins are disadvantageous inasmuch as the resultant epoxy resins have inferior physical properties, e.g., brittleness, loss in resistance to water absorption, strength, and the impairment of electrical properties. On the other hand, epoxy resins of the polyglycidyl ether of a polyhydric phenol type cured with a polyoxyalkylenepolyamine exhibit superior physical properties. However, curing with polyoxyalkylenepolyamines at ambient temperatures is often too slow for use in many applications.

There are a few prior art processes known for accelerating the cure of epoxy resins cured with a polyoxyalkylenepolyamine. For example, Lee, Henry and Neville, Kris, Handbook of Epoxy Resins, McGraw-Hill Book Co., N.Y., 1967, p. 7–15 describes the use of N-(2 aminoethyl) piperazine as an epoxy curing agent accelerator. U.S. Pat. No. 3,639,928 to Bentley et al. discloses a process for accelerating the curing of epoxy resins cured with a polyoxyalkylenepolyamine by incorporating therein an accelerator mixture of N-(3-aminopropyl) piperazine and salicylic acid. U.S. Pat. No. 3,875,072 describes an acceleration combination of piperazine and an alkanolamine.

However, known prior art processes and accelerators still, at times, may be too slow for many applications of epoxy resins requiring cures at ambient temperatures. On the other hand, it has been found that epoxy resins can be cured at ambient temperature with a polyoxyalkylenepolyamine in very short periods of time by using the improvement of an accelerator combination of the instant invention.

SUMMARY OF THE INVENTION

The instant invention provides a method for further accelerating the cure of polyoxide resins with polyoxyalkylenepolyamines by substituting for a portion of the polyoxyalkylenepolyamine from about 50 wt% to 100 wt% of a dithiocarbamate salt of the polyoxyalkylenepolyamine. We have found that by making such substitution even the curing of resins wherein a known accelerated combination is used can be further accelerated up to the point where it takes one-half or less of the time previously necessary to cure the resin. Cured polyoxides are useful in the formation of protective coatings, adhesives, seamless and terrazzo flooring, and as castings, potting, encapsulating, grouting, caulking and sealing compositions and the like. In many of these applications accelerating curing is convenient, if not essential. The dithiocarbamate salts are made by reacting the polyoxyalkylenepolyamine with carbon disulfide. The salt is then mixed with the polyoxyalkylenepolyamine and used as a curing agent for the epoxy resin, either in presence or in absence of an accelerator combination. The dithiocarbamate salt need not necessarily be separately made and mixed with the polyoxyalkylenepolyamine. It may be made by mixing sufficient carbon disulfide with the polyoxyalkylenepolyamine, while cooling, to give the desired mixture.

DESCRIPTION OF THE PREFERRED EMBODIMENT

More particularly, the instant invention is an improved process for accelerating the curing of an epoxy resin, particularly a polyglycidyl ether of a polyhydric phenol cured with a polyoxyalkylenepolyamine which comprises the steps of combining with a polyglycidyl ether of a polyhydric phenol, a polyoxyalkylenepolyamine and an accelerator combination. The improvement resides in substituting a dithiocarbamate salt of the polyoxyalkylenepolyamine for from about 50 wt% to 100 wt% of the polyoxyalkyleneamine itself, whether or not an accelerator combination is present. Of course, if minimum curing time is desired, an accelerator combination will be used to achieve maximum benefit from the practice of this invention.

Epoxy resins in general may be used in the present invention. Illustrative are the polyglycidyl ethers of mononuclear polyhydric phenols or polynuclear polyhydric phenols. Particularly desirable for purposes of this invention are the polyglycidyl ethers of the bis(hydroxyphenyl) alkanes. Exemplary are the diglycidyl ethers of bis-(p-hydroxyphenyl) methane. Other suitable epoxy resins are enumerated in U.S. Pat. No. 3,380,881, in "Epoxy Resins" Report No. 38, The Stanford Research Institute, June 1968, and in "Handbook of Epoxy Resins", supra, which references are herein incorporated by reference thereto. The epoxy resins have an epoxy equivalency of greater than one.

Suitable curing agents in the practice of this invention are polyoxyalkylenepolyamines of the formula:

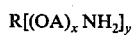

where R is a hydrocarbon radical, A is an alkylene radical having from two to four carbon atoms, x has an average value from 1 to 10, and y is an integer from 2 to 4 representing the valence of R. Preferred examples of the polyoxyalkylenepolyamines include polyoxypropylene diamines of the formula:

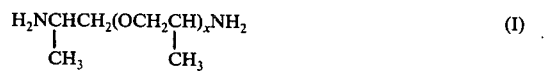

where x = 2 to 40, polyoxypropylene triamines of the formula:

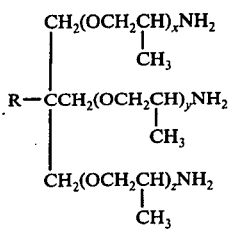

where R is a lower alkyl and $x+y+z=3$ to 40, and polyoxypropylene diamines of the formula:

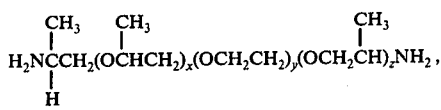

where $x+z=2$ to 10 and $y=1$ to 50.

With respect to selection of the preferred polyoxyalkylenediamines it is preferable in the practice of this invention to use polyoxypropylenediamines and triamines represented by the above formula which have a molecular weight of from about 200 to about 2,000, with the preferred molecular weight being around 400.

In the practice of this invention from about 50 to 100 wt%, preferably from about 70 wt% to about 90 wt% of the polyoxyalkylenepolyamines is replaced with a dithiocarbamate salt of the polyoxyalkylenepolyamines, either the same one being employed as the curing agent or another of the polyoxyalkylenepolyamines which fit within the above established criteria.

The dithiocarbamate salt is prepared by reacting carbon disulfide with the selected polyoxyalkylenepolyamine, with vigorous stirring, while cooling the mixture, preferably in an ice bath.

The desired proportion of the polyoxyalkylenepolyamine and the dithiocarbamate salt of the polyoxyalkylenepolyamine can be prepared by simply mixing the two ingredients together or, alternatively, it can be prepared by the above described procedure wherein an excess of the polyoxyalkylenepolyamine is mixed with the carbon disulfide to result in the desired proportions of amine and dithiocarbamate salt of the amine.

Surprisingly, it has been found that when the dithiocarbamate salt is used either alone or in combination with the polyoxyalkylenepolyamine a significant increase in the rate of curing results.

Of course, we attained even further accelerated curing of the epoxy resins, preferably the polyglycidyl ethers of mononuclear polyhydric phenols or polynuclear polyhydric phenols, when an accelerator composition is also incorporated into the reaction mixture. Such accelerator combinations are well known to those of ordinary skill in the art with a preferred combination being a mixture of piperazine and an alkanolamine having a ratio of piperazine to alkanolamine of from 1:8 to 1:1 as described in U.S. Pat. No. 3,875,072, the disclosure of which is incorporated herein by reference.

Other acceptable accelerator combinations are, for example, salicylic acid, N-(3-aminopropyl) piperazine and a polyamide as described in U.S. Pat. No. 3,793,271, the disclosure of which is incorporated herein by reference; a combination containing a substituted piperazine, salicylic acid and a phenol as described in U.S. Pat. No. 3,740,373, the disclosure of which is incorporated herein by reference; or an organic sulfonic acid as disclosed in U.S. Pat. No. 3,666,721, the disclosure of which is hereby incorporated herein by reference. Other known accelerators may also be used and the foregoing are merely examples of some such accelerator combinations.

The particular order of mixing the components is not critical in the practice of the instant invention. For example, the polyoxyalkylenepolyamine, the dithiocarbamate salt of the polyoxyalkylenepolyamine and the accelerator combination if any, may be blended in to provide a homogenous mixture of accelerated curing agents. The mixture may then be incorporated into or mixed with the epoxy resin component at the time of use to give an accelerated self-curing resin at ambient temperature.

The combined weight of any accelerator combination present when mixed with the polyoxyalkylenepolyamine and the dithiocarbamate salt of the polyoxyalkylenepolyamine may range from about 1 to 100 parts by weight per 100 parts by weight of the dithiocarbamate salt and polyoxyalkylenepolyamine mixture. The optimum proportions may vary somewhat for a given application depending on the particular epoxy resin, amine, dithiocarbamate salt and accelerator combination, if any, being utilized, and is best determined empirically for the most effective amount. This determination is well within ordinary skill in the art.

In the curing of epoxy resins, the curing agent is usually added in an amount that will provide one reactive —NH in the combined curing components for each epoxy group in the epoxy resin component. These are known in the art as stoichiometric quantities. Usually the stoichiometric quantities can be calculated from a knowledge of the chemical structure and analytical data on the particular components being utilized. However, many times the stoichiometric quantity is also found empirically. Preferably, these components are utilized in amounts that will provide up to 10 percent excess of the stoichiometric amount of the amine.

Should fire retardance be required for the epoxy resins cured by the method of the present invention, it will be understood that various fire retardants for epoxy resins in compositions known in the art can be utilized without departing from the intended scope of the invention. Experiments have shown that well known epoxy resin fire retardants, for example, various halogenated compounds, phosphate compounds, including piperazine phosphate, and the like, can be utilized in effective amounts in the above-described inventive process without affecting the effect of the accelerator combination upon the accelerated curing rate. Preferably, where fire retardance is desirable, an effective amount of piperazine phosphate is incorporated into the above-described mixture of epoxy resin, polyoxyalkyleneamine dithiocarbamate salt of the polyoxyalkylamine and accelerator combination. Accordingly, the piperazine phosphate may be added at any time during the mixing of the components without affecting the described effect.

The above-described mixture of epoxy resin, polyoxyalkylenepolyamine, dithiocarbamate salt of the polyoxyalkyleneamine and accelerator combination is also preferably allowed to self-cure at ambient room temperatures of between about 0° to about 45° C. However, the mixture can be cured or post-cured at elevated temperatures up to about 175° C, if desirable and convenient.

The following example illustrates the practice of the invention in more detail but is not to be construed as limiting.

EXAMPLE.

A suitable dithiocarbamate salt was made by adding to 1281 g (3.0 mols) JEFFAMINE ® D-400, a polyoxypropylene diamine having an average molecular weight of about 400, and an equivalent weight per active hydrogen of about 80, 90 ml (1.5 mol) carbon disulfide (added below the surface of the amine) with vigorous stirring at 10°–20° C (ice cooling). The resulting almost colorless, viscous solution was briefly stripped at 25° C in an aspirator vacuum and used as curing agent for epoxy resin composition.

The epoxy resin formulations set forth in the following table were prepared in separate containers at room temperature (about 25° C). Equal amounts of epoxy resin for each example were mixed with the curing agent prepared as described above, with or without an additional accelerator component. The gel time was noted in each case.

| Formulation: (parts by weight) | A | B | C | D |
|---|---|---|---|---|
| Epoxy resin [1] | 100 | 100 | 100 | 100 |
| Jeffamine D-400 dithiocarbamate salt | 40 | — | 30 | — |
| JEFFAMINE ®D-400 | — | 40 | — | 35 |
| Accelerator combination [2] | — | — | 10 | 10 |
| Brook visc., cps. | 2200 | 800 | 2100 | 1100 |
| Gel time, mins. (200 g mass) | (3) | (4) | 14.5 | 30.0 |
| Peak exotherm, ° C. | 57(after 100mins.) | 28(after 150mins.) | 157 | 155.5 |

[1] A diglycidyl ether of Bisphenol A; Epoxy equivalent weight: 190.
[2] Triethanolamine and piperazine in weight ratio of 70:30.
[3] Resin did not gel; viscosity increased to 35,000 cps after 130 mins.
[4] Resin did not gel; viscosity increased to 1000 cps after 150 mins. Little evidence of reaction after 150 mins.

Note that non-accelerated curing with the dithiocarbamate salt of JEFFAMINE D-400, although sluggish, was found to be considerably more rapid than with JEFFAMINE D-400 above as shown in the viscosity and peak exotherm.

In combination with an accelerator, curing was also more rapid with the dithiocarbamate salt. The time to reach a gel point was less than one-half the time required with the similarly accelerated polyoxyalkylenediamine. Thus even by comparison with a rapid-setting accelerator composition the use of the dithiocarbamate salt of the polyoxypropylene amines hereinbefore described is advantageous.

Comparable results to those illustrated hereinabove are obtained by using other accelerator combinations within the invention disclosed but not specifically illustrated. Obviously many modifications and variations of the invention as hereinbefore set forth may be made without departing from the spirit and scope thereof, and, therefore, only such limitations should be imposed as indicated in the appended claims.

We claim:

1. A method for acclerating the curing of an epoxy resin with at least a stoichiometric amount of a polyoxyalkylenepolyamine curing component wherein the curing component comprises a polyoxyalkylene-polyamine having a molecular weight of from about 230 to about 2000 and a dithiocarbamate salt of the polyoxyalkylene polyamine, wherein about 50 wt% to about 100 wt% of said polyoxyalkylenepolyamine is replaced by the dithiocarbamate salt of said polyoxyalkylenepolyamine.

2. The method of claim 1, wherein the polyoxyalkylenepolyamine is a polyoxypropylene diamine or triamine.

3. The method of claim 1, wherein the polyoxypropylenediamine or triamine has an average molecular weight of about 400.

4. The method of claim 1, wherein the curing component also includes an additional accelerator.

5. The method of claim 4, wherein the additional accelerator is a mixture of piperazine and an alkanolamine having a weight ratio of piperazine to alkanolamine of from 1:8 to 1:1.

6. The method of curing an epoxy resin by mixing with said resin at least a stoichiometric amount of a curing composition consisting essentially of from about 50 wt% to about 100 wt% of a dithiocarbamate salt of a polyoxypropylenediamine or triamine having an average molecular weight of from about 230 to about 2000; from about 10 wt% to about 40 wt% of an accelerator combination consisting of piperazine and an alkanolamine in a weight ratio of piperazine to the alkanolamine of from about 1:8 to 1:1; with the balance of the curing composition being a polyoxypropylene diamine or triamine having a molecular weight of from about 230 to about 2000.

* * * * *